US008850325B2

(12) United States Patent
Cheng et al.

(10) Patent No.: US 8,850,325 B2
(45) Date of Patent: Sep. 30, 2014

(54) SCALING SOCIAL NETWORKS

(75) Inventors: Lili Cheng, Bellevue, WA (US); Owen Charles Braun, Seattle, WA (US); Alice Jane Bernheim Brush, Seattle, WA (US); Alex D Daley, Kenmore, WA (US); Susan T. Dumais, Kirkland, WA (US); Dragos A Manolescu, Kirkland, WA (US); Henricus (Erik) Johannes Maria Meijer, Mercer Island, WA (US); Simon C Muzio, Redmond, WA (US); John Oberon, Seattle, WA (US); Rebecca Ann Norlander, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1278 days.

(21) Appl. No.: 12/542,564

(22) Filed: Aug. 17, 2009

(65) Prior Publication Data

US 2010/0169789 A1 Jul. 1, 2010

Related U.S. Application Data

(63) Continuation of application No. 12/345,848, filed on Dec. 30, 2008, now abandoned.

(51) Int. Cl.

| | |
|---|---|
| ***G06F 13/00*** | (2006.01) |
| ***G06F 15/00*** | (2006.01) |
| ***G06Q 30/00*** | (2012.01) |

(52) U.S. Cl.

CPC ..................................... *G06Q 30/00* (2013.01)
USPC .......................................... 715/738; 715/745

(58) Field of Classification Search

CPC . H04L 67/00; H04N 21/4314; H04N 21/4316
USPC ................ 715/751, 745, 763–765, 810, 738, 715/853–855
See application file for complete search history.

(56) References Cited

U.S. PATENT DOCUMENTS

| | | | | |
|---|---|---|---|---|
| 7,991,764 | B2 * | 8/2011 | Rathod | 707/713 |
| 8,219,134 | B2 * | 7/2012 | Maharajh et al. | 455/519 |
| 2008/0040673 | A1 | 2/2008 | Zuckerberg et al. | |

(Continued)

OTHER PUBLICATIONS

"Facebook-Like Features behind Your Firewall", http :1/www. newsgator. com/sol utions/facebook-enterprise .aspx. Last accessed Oct. 15, 2008, 2 pages.

(Continued)

*Primary Examiner* — Cao "Kevin" Nguyen
(74) *Attorney, Agent, or Firm* — Dan Choi; Judy Yee; Micky Minhas

(57) ABSTRACT

The claimed subject matter relates to an architecture that can scale a content feed in terms of the amount of content delivered in order to facilitate satisfactory experiences in connection with a social network. In particular, the architecture can utilize a content feed to disseminate content between members of a network community, generally relative to a particular social circle of a given user. The architecture can maintain a personal space for the user and display to the personal space content provided by a content feed. Content provided to the personal space (as well as that retrieved from the personal space) can be scaled based upon a variety of commitment characteristics associated with the social circle. In addition, the architecture can employ smart dispersal of content and can intelligently acquire additional content from the user or import suitable settings from disparate users.

20 Claims, 11 Drawing Sheets

(56) References Cited

U.S. PATENT DOCUMENTS

| | | | | |
|---|---|---|---|---|
| 2008/0065701 | A1 | 3/2008 | Lindstrom et al. | |
| 2008/0104172 | A1 | 5/2008 | Craig | |
| 2008/0126476 | A1 | 5/2008 | Nicholas et al. | |
| 2008/0189169 | A1 | 8/2008 | Turpin et al. | |
| 2008/0201225 | A1* | 8/2008 | Maharajh et al. | 705/14 |
| 2008/0209351 | A1 | 8/2008 | Macadaan et al. | |
| 2011/0276396 | A1* | 11/2011 | Rathod | 705/14.49 |

OTHER PUBLICATIONS

"New Social Network for Content Professionals: The Content Wrangler Community", Published online Mar. 7, 2008. http://www . thecontentwrangler .com/article/new_ social_ network for_ content_professionals. Last accessed Oct. 15, 2008, 3 pages.

"Social Media Networking Meets RSS Content Aggregation and Promotion: Genwi", Published online Mar. 20, 2007. http :1/www. masternewmedia. org/news/2007/03/20/social_ media_ networking_ meets rss. htm. Last accessed Oct. 15, 2008, 14 pages.

"Social Network Management System", Published Online Jan. 4, 2008 http://www.rmdstudio.com/social-media/social-network-management-system-development.html. Last accessed Oct. 15, 2008, 4 pages.

* cited by examiner

SCALING SOCIAL NETWORKS

CROSS-REFERENCE TO RELATED APPLICATIONS

This application is a continuation of, and claims priority to, U.S. patent application Ser. No. 12/345,848, filed on Dec. 30, 2008, entitled, "Scaling Social Networks." This application is also related to U.S. patent application Ser. No. 12/248,251, filed on Oct. 9, 2008, entitled, "TRANSIENT NETWORKS." These applications are incorporated in entirety herein by reference.

BACKGROUND

The inexorable growth of the Internet in recent times has fostered many new paradigms and new markets for social interaction. In some cases, the Internet has changed the conventional way many people worldwide meet and maintain friendships. Today, there are abundant examples of social networking sites and services that aid in forming communities, creating and maintaining personal virtual spaces, managing social circles, personal contacts and communications, content sources and so forth.

Generally, conventional social networking systems or services utilize static content feeds to propagate content between users. It is sometimes possible to customize these feeds to some degree in advance based upon user settings. However, these settings usually must be manually input and often relate only to the types of content that can be propagated and, therefore, do not contemplate or address the many immediate or latent difficulties that can arise as a result, any of which can detrimentally affect the user's experiences in connection with the social networking service.

For example, an active user with a thriving social circle can have her experiences quickly deteriorate when the burden of maintaining her personal space grows too onerous, possibly due in part to a very natural and predictable growth of her social circle over time. Likewise, a relatively inactive user might never get off the ground due to infrequent activity and/or a small set of friends who themselves might be relatively inactive and, thus, entirely miss many of the available features that drive popular social networking services. Employing conventional static content feeds fail to address these and other difficulties.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises an architecture that can scale or throttle the flow of content from a content feed in order to, e.g., aid in managing a personal space or improving the quality of the experience in connection therewith. In accordance therewith and to other related ends, the architecture can authenticate or authorize access to a personal space associated with a social circle that can be defined by a contact list included in the personal space. The personal space can be associated with a particular user of a social networking service and can, along with the social circle as well as a broader community of user or spaces, be maintained by a provider of the social networking service.

In more detail, the architecture can employ a content feed for displaying content to the personal space as well as propagating content from the personal space to disparate users or spaces, often those included in the social circle of the user. However, rather than implementing a static content feed, the architecture can instead employ a content feed that is customizable, e.g., in terms of an amount or quantity of content that is propagated. Thus, the architecture can scale or throttle the content feed, and can do so based upon a set of commitment characteristics associated with the social circle. Hence, the content feed can adapt to an individual rather than forcing the individual to fit a predefined specification.

These commitment characteristics can relate to, e.g., a recent level of activity in connection with the user, a historic level of activity in connection with the user, a size of the social circle, a recent level of activity of one or more contacts included in the social circle, a historic level of activity of one or more contacts included in the social circle, or a level of current or upcoming other obligations or commitments.

Moreover, the architecture can employ smart dispersal of content. Smart dispersal of content can disseminate content (either to or from the personal space) over time rather than immediately upon input or receipt. Thus, smart dispersal can, inter alia, simulate frequent updates to the personal space even in situations in which no new data is received or no current update occurs. For example, the user can input a large amount of data at a given time, say, a large number of favorite books or multiple photos. However, this information, or other data typically provided over the content feed, can be disseminated one book or one photo per day, for example, resulting in the impression that frequent activity is occurring. Furthermore, smart dispersal can effectuate a time-shifting mechanism that highlights or underscores certain content or simply delivers the content when the content can be suitably appreciated or digested, or when less likely to be overlooked or glossed over.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
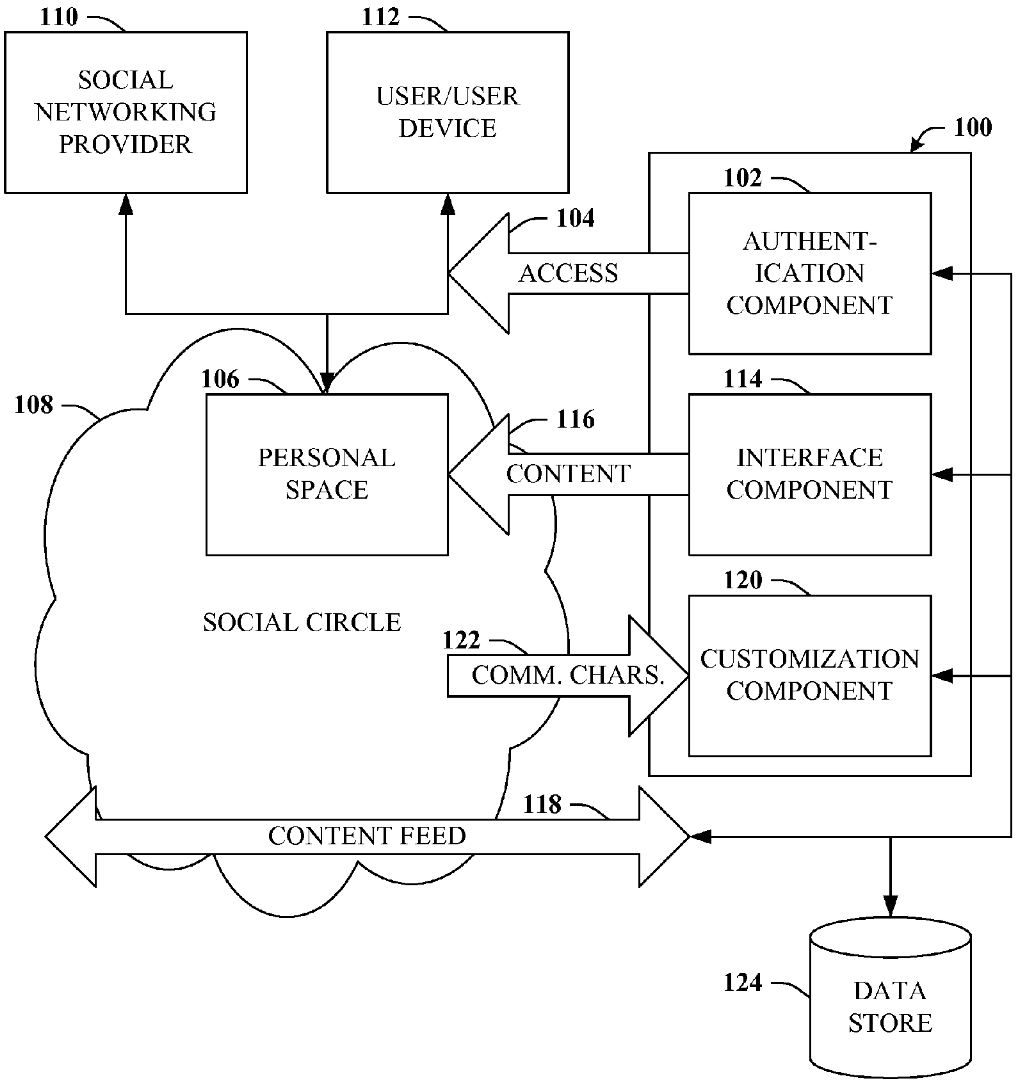
FIG. 1 illustrates a block diagram of a computer-implemented system that can scale or throttle a content feed to facilitate satisfactory experiences in connection with a social network.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, computer-implemented system 100 that can scale or throttle a content feed to facilitate satisfactory experiences in connection with a social network is depicted. Generally, system 100 can include authentication component 102 that can authorize access (denoted access 104) to personal space 106, wherein personal space 106 can be associated with social circle 108. As one example, authentication component 102 can provide a login feature to personal space 106 or negotiate credentials in another manner. Personal space 106 can be maintained by provider 110 of a social networking service and can be associated with user 112 of the social networking service. Typically, personal space 106 will be a personalized web site that includes information relevant to user 112 such as a profile, activities, relationships, photos or other media content, weblogs (e.g., blogs) and so forth.

In addition, system 100 can also include interface component 114 that can interface personal space 106 to content feed 118. In one or more aspects, interface component 114 can display content 116 that is provided by content feed 118 to personal space 106. For example, content 116 can originate from members of social circle 108 such as blogs, descriptions, or activities from friends, or be delivered from other selected sources such as stock quotes, weather, or news, sources that can also be included in social circle 108. Additionally or alternatively, content feed 118 can be interfaced to third party feeds or disparate data sources. Appreciably, conventional social networking systems or services employ a standard content feed that operates the same way irrespective of a user's behavior patterns and/or her set of friends. Thus, users of these conventional systems or services start off with, or often gravitate over time toward, an unsuccessful social networking experience. In many cases, these unsuccessful experiences stems from the fact that the content feed is static and/or only adjustable in terms of the type or category of data that is propagated, and therefore does not take into account many potentially relevant criteria associated with social circle 108 that might otherwise be employed to improve the satisfaction of user 112.

For instance, consider Ashley, an active user who has a very worthwhile experience in connection with the social networking service soon after initiating the service when she has, say, 50 friends. Yet, over time, as her number of friends grows, her level of commitment to maintaining her personal space typically grows proportionately. Thus, the overall experience Ashley perceives can begin to resemble work rather than enjoyment and her experiences can deteriorate rather quickly thereafter. Appreciably, this deteriorating experience for Ashley can directly and immediately affect those in her social circle as well, creating a snowballing effect. As another example, consider Ross, who on the other hand somewhat reluctantly joins the social networking service. Ross starts off with a much lower level of commitment, say, a mere handful of friends or contacts, and he generally remains inactive for the most part, or his particular social circle includes contacts who are, like him, largely inactive users. Thus, Ross also fails to achieve a successful or satisfactory experience, but for a different, largely opposite, reason as Ashley. However, these issues can be substantially mitigated by dynamically modifying the content feed (as opposed to conventional systems that provide a static feed) to scale based upon activity, context, or personality characteristics associated with the particular user.

In accordance therewith, system 100 can further include customization component 120 that can throttle content feed 118 based upon set 122 of commitment characteristics associated in some manner with user 112. For example, set 122 of commitment characteristics can relate to personal space 106 or social circle 108 of user 112. Set 122 of commitment characteristics are further detailed with reference to FIG. 3, while more discussion relating to customization component 120 can be found with reference to FIG. 4.

In addition, it should be understood that system 100 can also include or be operatively connected to data store 124. Data store 124 is intended to be a repository of all or portions of data, data sets, or information described herein or otherwise suitable for use with the claimed subject matter. Data store 124 can be centralized, either remotely or locally cached, or distributed, potentially across multiple devices and/or schemas. Furthermore, data store 124 can be embodied as substantially any type of memory, including but not limited to volatile or non-volatile, sequential access, structured access, or random access and so on. It should be understood that all or portions of data store 124 can be included in system 100, or can reside in part or entirely remotely from system 100. It should also be understood that system 100 can be a component of the social networking service (or included in a system thereof) offered by provider 110.

Figure 2:
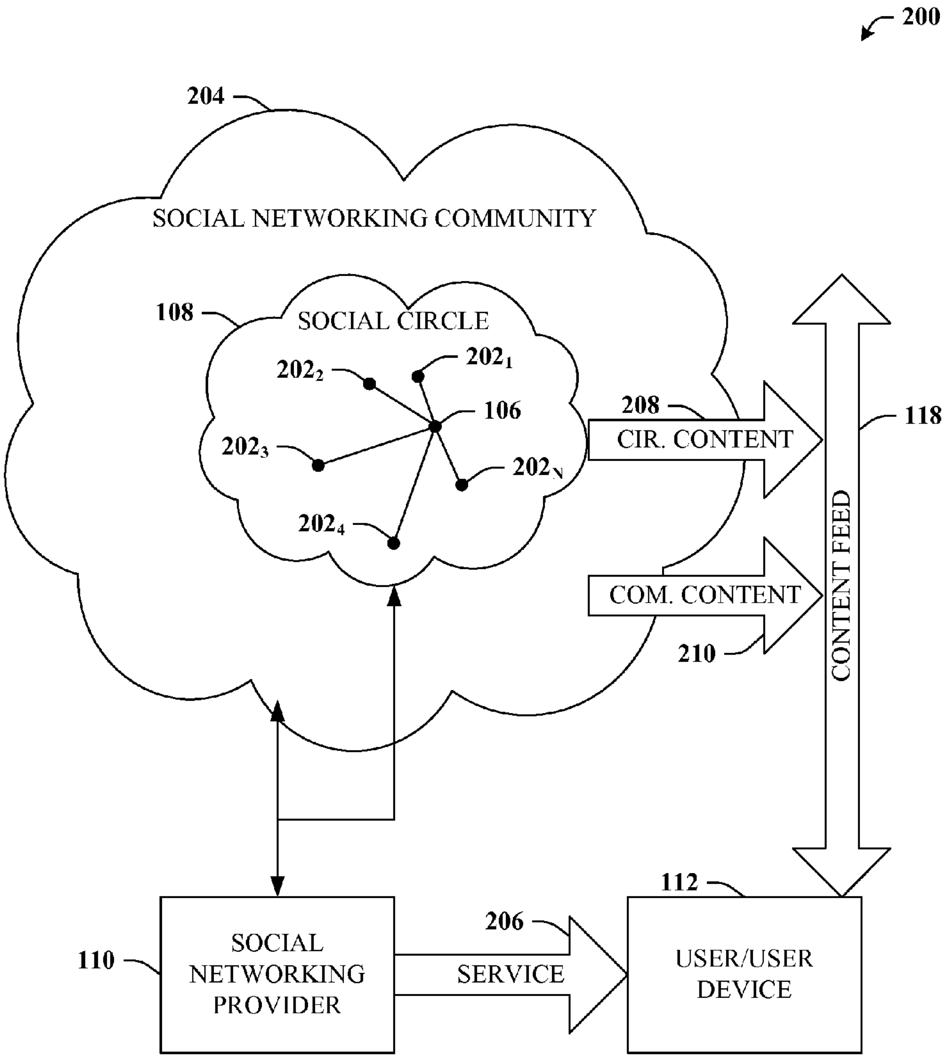
FIG. 2 illustrates a block diagram of a system that can provide a content feed to a user of a social network service.

Turning now to FIG. 2, system 200 that can provide a content feed to a user of a social network service is illustrated. As introduced supra, system 200 can include social circle 108 that substantially encompasses the friends, family, colleagues, or other contacts known to or associated with user 112. Thus, social circle 108 can of course include personal space 106, which can be represented as a root node of the circle 108 maintained by provider 110. Likewise, social circle 108 can include a set of disparate nodes $\mathbf{202}_1$-$\mathbf{202}_N$, which can be referred to either individually or collectively as disparate node(s) 202 with individual subscripts called out only when necessary to specify or avoid confusion. Substantially any number, N, disparate nodes 202 can be included in social circle 108, and each disparate node 202 can represent a disparate user (not shown) of the social networking service who is also a contact of user 112 as described by personal space 106.

Moreover, social circle 108 can constitute a portion of community 204 that is maintained by provider 110 and accessible by way of the social networking service. In other words, while social circle 108 can be comprised of substantially all contacts of user 112, community 204 can be comprised of substantially all users of the social network service, even those who are not members of social circle 108. In one or more aspects of the claimed subject matter, content feed 118 can provide content to user 112 (or an associated device thereof) available from a contact (e.g., disparate node 202) included in social circle 108, which is denoted here as circle content 208. For example, activity, blogs, messages, or personal details of a member of social circle 108 can populate content feed 118, which can then be provided to personal space 106. Additionally or alternatively, content feed 118 can provide content available from community 204, which is identified as community content 210, and is further discussed infra. However, unlike conventional systems or services, content feed 118 can be throttled or scaled to adapt to a particular user's activity or behavior based upon that user's potentially unique set 122 of commitment characteristics, which are further detailed in connection with FIG. 3.

Figure 3:
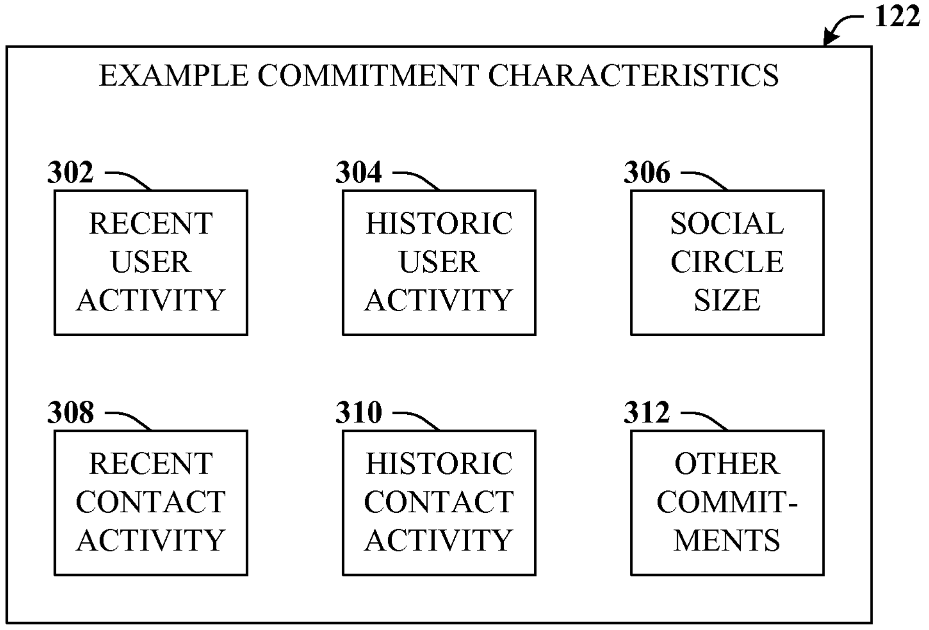
FIG. 3 graphically depicts various example commitment characteristics 122.

Referring now to FIG. 3, various example commitment characteristics 122 are provided. As previously discussed, customization component 120 can control content feed 118 based upon one or more commitment characteristics associated with social circle 108. Commitment characteristics 122 can be, e.g., recent user activity 302 such as a number of updates or changes to personal space 106. Recent user activity 302 can also relate to a number of times user 112 has logged in recently. For instance, frequent logins can indicate user 112 would be interested in receiving more content 116 from content feed 118, even if those in social circle 108 have not contributed much recently.

Another example of a commitment characteristic 122 can be historic user activity 304. For instance, by comparing recent activity 302 to historic activity 304, various distinctions can be teased out with respect to activity changes over time. Moreover, commitment characteristic 122 can also relate to social circle size 306. In particular, a number of friends user 112 has and/or the size of social circle 108. Similarly, commitment characteristic 122 can be recent contact activity 308 or historic contact activity 310. More specifically, just as the activity of user 112 can represent commitment characteristics (e.g., activity 302, 304), so too can activity of friends or other contacts described by social circle 108 or user 112.

Likewise, commitment characteristics 122 can relate to a level of current or upcoming other obligations or commitments 312. For example, if it is detected that user 112 (or potentially another member of social circle 108) is confronted with eminent work-related deadlines, or is, say, currently on holiday, then it is therefore more likely that user will have less time to devote to personal space 106. Accordingly, content feed 118 can be scaled back somewhat to accommodate the current situation. Moreover, especially in connection with smart content dispersal (detailed infra), when reducing content flow due to a temporary situation, any content removed can be subsequently provided to ensure user 112 remains in touch with his or her social circle 108 and/or does not miss out on important events or contacts that might otherwise fall off the radar so to speak when user 112 has inadequate time to devote to personal space 106. It should be understood that the opposite situation can apply as well, such as when other commitments 312 indicate an abundance of time to devote to personal space 106. It should be appreciated that the above examples of commitment characteristics 122 are intended to be exemplary and other commitment characteristics 122 are of course possible and can be employed in a like manner without departing from the spirit and scope of the appended claims.

Figure 4:
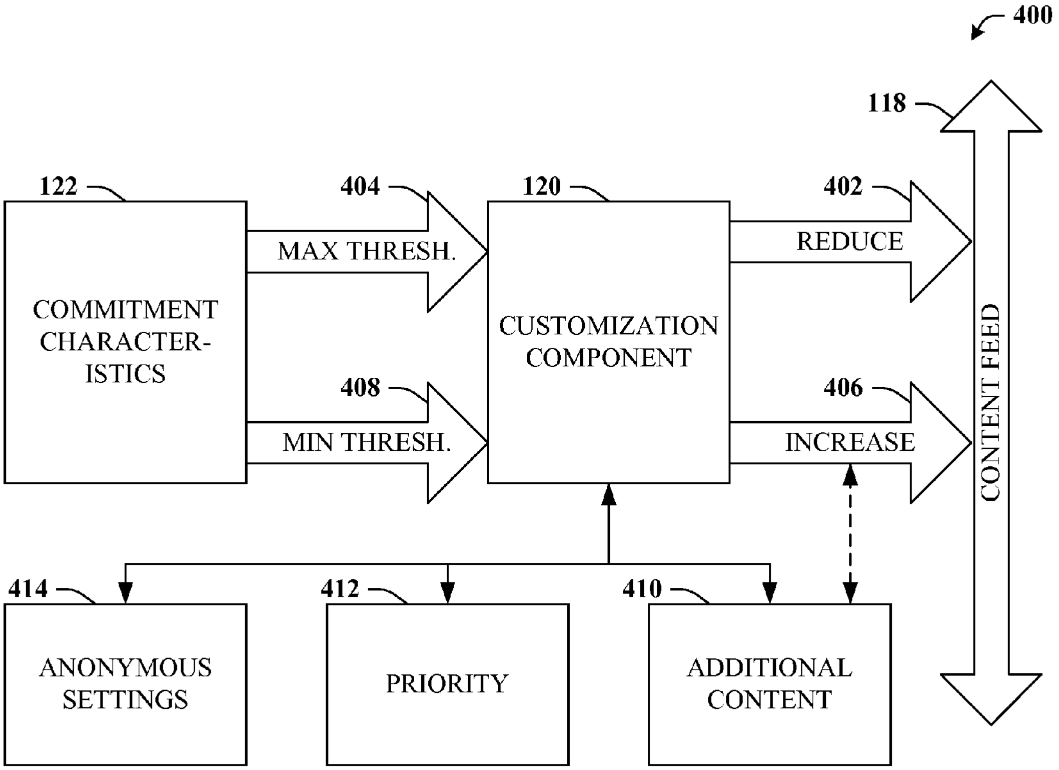
FIG. 4 illustrates a block diagram of a computer-implemented system that can provide various customized updates in connection with a social networking system or service.

With reference now to FIG. 4, system 400 that can provide various customized updates in connection with a social networking system or service is depicted. In general, system 400 can include customization component 120 that can throttle content feed 118 based upon one or more commitment characteristics 122 associated with social circle 108 as substantially detailed supra. In particular, according to one or more aspects of the claimed subject matter, customization component 120 can provide a reduction 402 to content flow from content feed 118 when commitment characteristics surpass a maximum activity threshold 404. For example, returning to the example introduced above in which Ashley maintained a very satisfactory experience when she had about 50 friends, yet her experiences began to degrade when new friends were accumulated, which ultimately required her to commit more resources to maintaining her personal space than was enjoyable. In such a case, customization component 120 can identify maximum activity threshold 404, and reduce the standard flow of information from content feed 118.

In contrast, in one or more aspects, customization component 120 can provide an increase 406 to content flow from content feed 118 when commitment characteristics 122 indicate a drop below minimum activity threshold 408. Hence, continuing the previous example, suppose Ashley's commitment characteristics 122 indicate a drop in activity or commitment such that her activity falls below not only maximum threshold 404, but also minimum activity threshold 408. Thus, increase 406 can be implemented, potentially undoing in whole or in part the previous reduction 402. Naturally, in this case, content feed 118 can return to what is commonly provided from a substantially standard content flow.

However, in other cases, such as in the example case cited above in which Ross begins with few friends and very little commitment to his personal space. In such a case, the standard content feed might not ever overcome a minimum activity threshold 408 necessary to reliably ensure a successful or satisfactory experience for Ross. Accordingly, customization component 120 can identify suitable additional content 410 to include in content feed 118, e.g., to accompany increase 406. As one example, additional content 410 can be community content 210 beyond what normally is provided by social circle 108 alone. Moreover, customization component 120 can identify additional content 410 based upon a variety of factors. Such factors can include, but need not necessarily be limited to, a popularity of the identified additional content 410, a similarity between user 112 and other users who receive additional content 410, or a similarity between social circle 108 and other social circles that receive additional content 410. Furthermore, additional content 410 can be historic content that can be resurfaced based upon characteristics of significance. For instance, additional content 410 that relates to one's wedding can be selected if, say, a 10 year wedding anniversary is temporally near. As another example, suppose a particular picture posted a couple years ago was view 1,000 times or more than any other picture. In that case, the particular picture can be resurfaced as additional content 410.

Furthermore, when providing reduction 402 or increase 406, customization component 120 can filter or select content from content feed 118 based upon priority 412 associated with the selected or filtered content. Priority 412 can be determined based upon at least one of settings or preferences associated with user 112, settings or preferences associated with like or similar user spaces, machine-learning techniques in connection with historic activity or behavior, or machine-based inferences in connection with satisfactory use of the social networking service. More detail relating to machine-learning or machine-based inferences can be found infra with reference to FIG. 6.

In one or more aspects of the claimed subject matter, customization component 120 can anonymously import settings 414 or preferences from the similar user space in order to facilitate a richer experience for user 112 in connection with personal space 106. For example, while content feed 118 as well as many other aspects associated with a user's experience with personal space 106 can be explicitly tailored based upon personal preferences, much of the labor or overhead for such customization can be performed automatically by customization component 120 by leveraging commonalities between members of community 204. Appreciably, while settings 414 can be shared among disparate users, such sharing can be accomplished in an anonymous manner such that privacy concerns will not generally arise. For instance, the identity of the party from whom settings 414 are imported need not be disclosed. Rather, it can be enough to utilize settings 414 that are empirically determined to be appropriate without revealing from whom theses settings 414 were copied.

Figure 5:
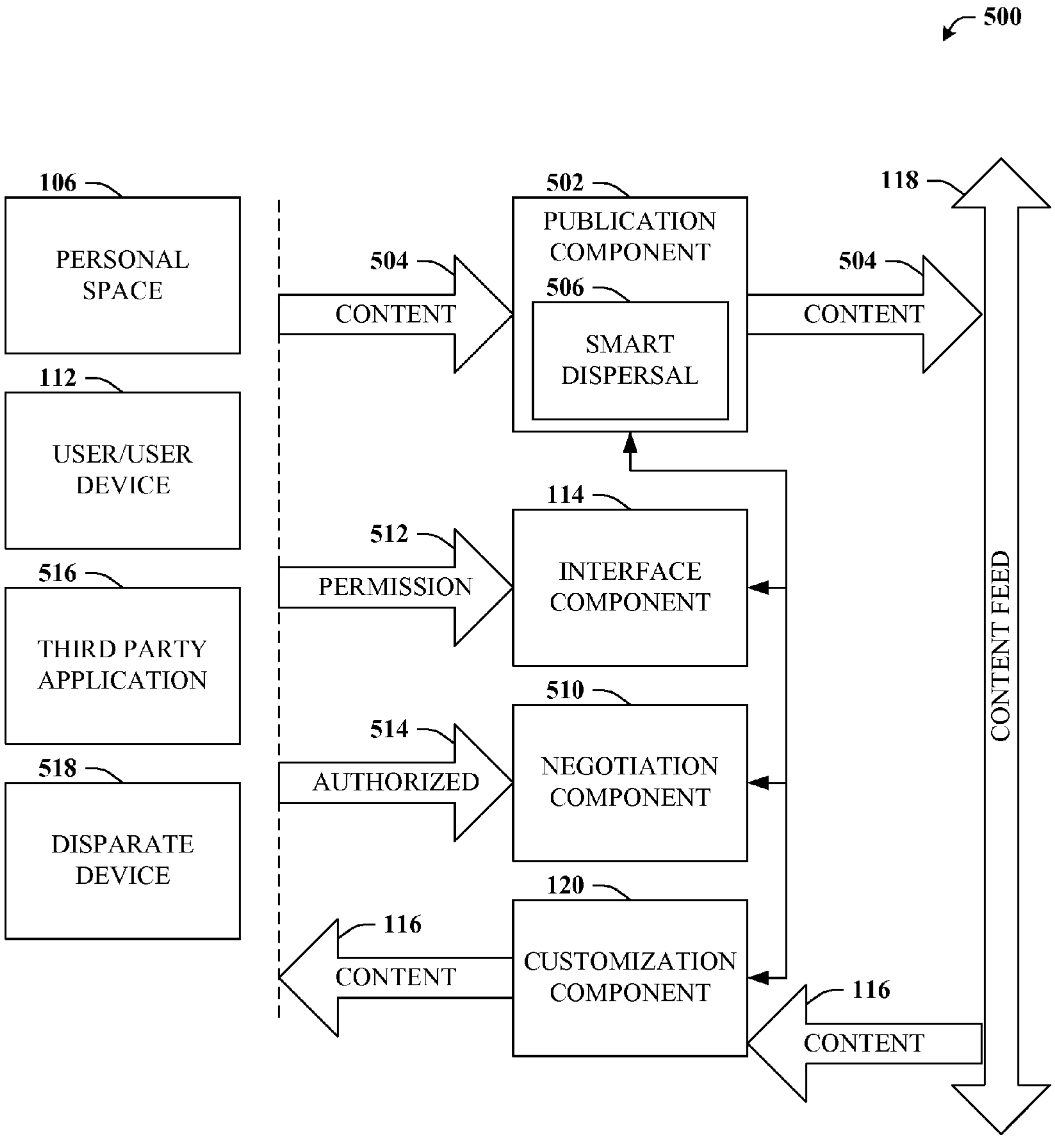
FIG. 5 is a block diagram of a system that can obtain and/or publish content to the content feed.

Turning now to FIG. 5, system 500 that can obtain and/or publish content to the content feed is illustrated. System 500 can include publication component 502 that can provide to content feed 118 content 504 from personal space 106 (or user 112). Thus, just as user 112 can receive content 116 from, inter alia, members of his or her social circle 108, those same friends can receive content 504 from user 112. In one or more aspects of the claimed subject matter, publication component 502 can employ smart dispersal 506 of content 504. Smart dispersal 506 can disseminate content 504 over time rather than immediately upon input. Thus, smart dispersal 506 can simulate frequent updates to personal space 106 even when no such new data is received or no update occurs. For example, user 112 can input a large amount of data at a given time, say, a large number of favorite books or multiple photos. However, this information, or other data typically provided over content feed 118, can be disseminated one book or photo per day, for example, resulting in the impression that frequent activity is occurring.

In addition, system 500 can also include negotiation component 510 that can acquire permission 512 from user 112. As depicted, permission 512 can be acquired by way of interface component 114, which can interface directly with personal space 106 or user (or associated device) 112. In some aspects, all or portions of negotiation component 510 can be included in interface component 114. Permission 512 typically relates to informed consent from user 112 to populate content feed 118 with authorized content 514 included in or obtained from third party application 516 or disparate device 518. For instance, a brief message can be delivered to user 112 requesting permission 512.

By way of illustration, authorized content 514 can include, e.g., current location data obtained from a Global Positioning System (GPS) application or another location-based system or service. Thus, current location information associated with user 112 can be utilized to update personal space 106 and/or content feed 118. Appreciably, such information can be substantially similar to more traditional content-based updates that provide insight or familiarity and often enrich the experiences for those in social circle 108, yet can be performed automatically without the burden of manually inputting such data. In addition to location data, relevant information can be extracted from substantially any third party application 516 or disparate device 518 such as automatically obtaining photos (e.g., from a camera or from emails or a calendar), automatically converting emails to blogs, automatically analyzing purchase transactions for updating favorites lists, interests, recent activities or the like and so forth.

Hence, while much of these types of updates can be performed automatically, such updates can still retain various personal touches or flourishes to further the perception of active involvement while simultaneously avoiding the negative connotations often associated with some automated transactions. Appreciably, once permission 512 is ascertained, negotiation component 510 can interface with third party application 516 or disparate device 518 to obtain authorized content 514. Naturally, the actual dissemination of authorized content 514 to content feed 118 can be accomplished by publication component 502, potentially leveraging smart dispersal 506.

Moreover, although not expressly illustrated, smart dispersal 506 can be utilized by customization component 120 as well, e.g., in connection with content 116 provided from rather than to content feed 118. Thus, content updates from, e.g., social circle 108 can be smoothed or more evenly spread over time to budget remote activity. Likewise, smart dispersal 506 can also be employed in connection with reduction 402 and/or increase 406. In particular, rather than filtering content 116 entirely when reduction 402 is required, such content can be delayed for a time.

Figure 6:
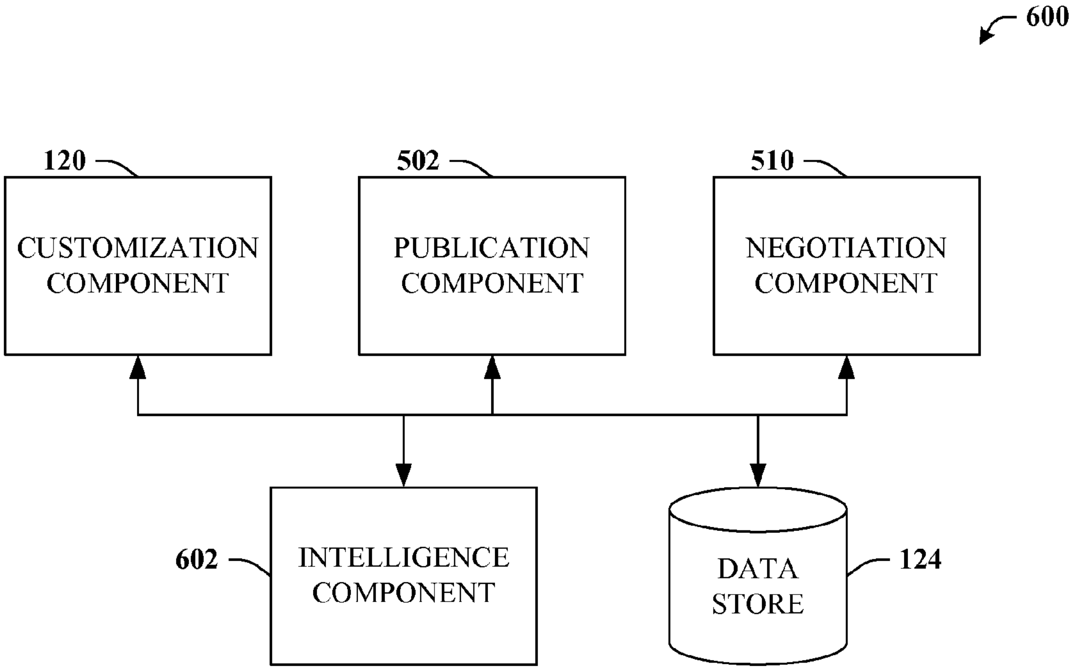
FIG. 6 is a block diagram of a system that can provide for or aid with various inferences or intelligent determinations.

Referring now to FIG. 6, system 600 that can provide for or aid with various inferences or intelligent determinations is depicted. Generally, system 600 can include customization component 120, publication component 502 and negotiation component 510 as substantially described herein. In addition to what has been described, the above-mentioned components can make intelligent determinations or inferences. For example, customization component 120 can intelligently determine or infer the degree to which a standard content feed should be modified based upon personality or behavioral profiling techniques. For instance, while one user might be comfortable with numerous updates per day to and from content feed 118, another user might find that one or a few updates per week is more suitable. Hence, content feeds can be uniquely tailored to each particular user by applying suitable behavior traits to the commitment characteristics 122.

Customization component 120 can also employ intelligent determinations or inferences in connection with identifying suitable additional content 410, assigning priority 412 to various content (e.g., content 116 or content 504), or determining similarities in connection with importing anonymous settings 414. In addition, publication component 502 can intelligently determine or infer when to activate smart dispersal 506 as well as forecasting the appropriate rate or frequency for the smart dispersal 506. Negotiation component 510 can intelligently determine or infer suitable authorized content 514 even prior to requesting permission 512. Any of the foregoing inferences can potentially be based upon, e.g., Bayesian probabilities or confidence measures or based upon machine learning techniques related to historical analysis, feedback, and/or other determinations or inferences.

In addition, system 600 can also include intelligence component 602 that can provide for or aid in various inferences or determinations. In particular, in accordance with or in addition to what has been described supra with respect to intelligent determination or inferences provided by various components described herein. For example, all or portions of customization component 120, publication component 502, or negotiation component 510 (as well as other components described herein) can be operatively coupled to intelligence component 602. Additionally or alternatively, all or portions of intelligence component 602 can be included in one or more components described herein. Moreover, intelligence component 602 will typically have access to all or portions of data sets described herein, such as data store 124.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
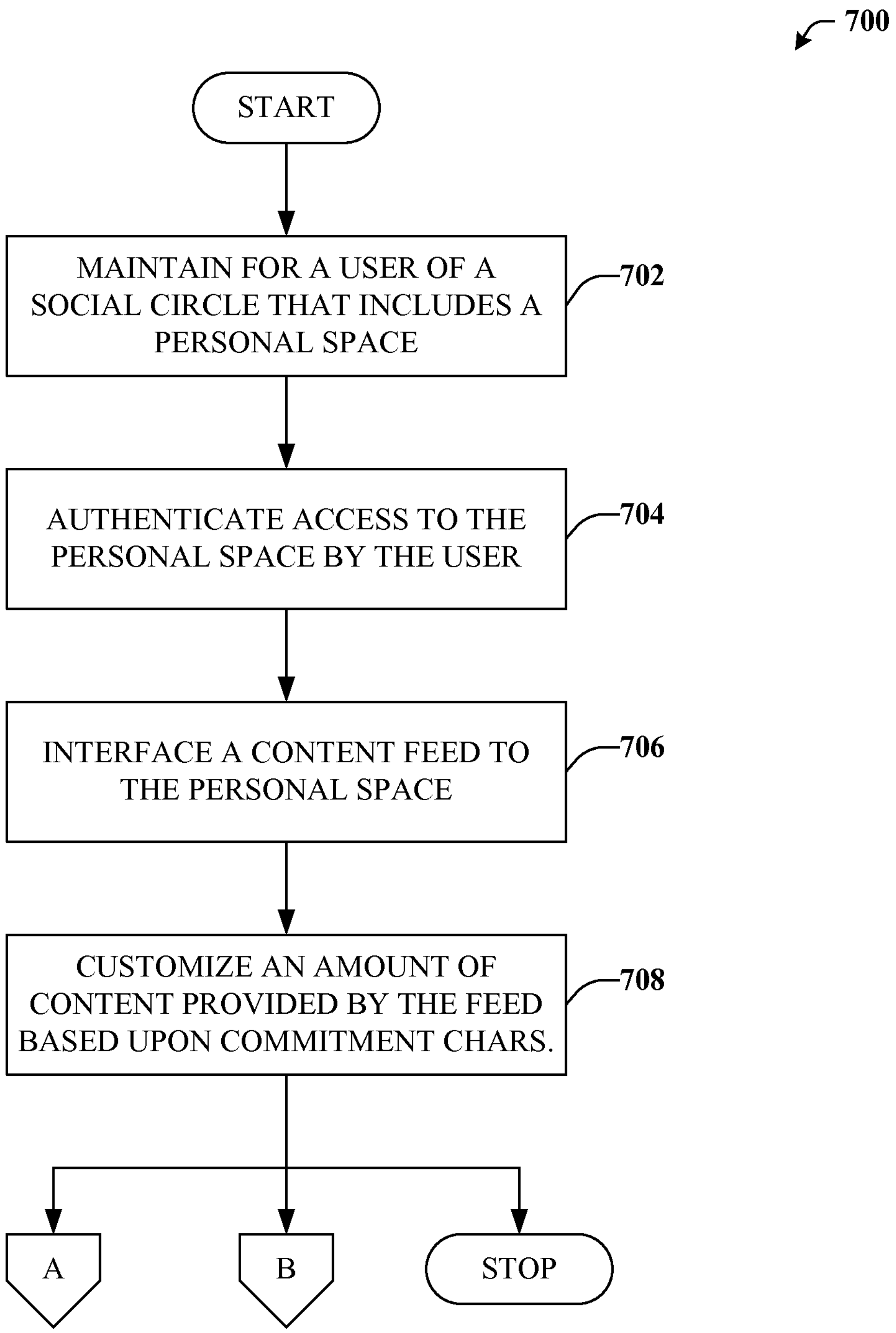
FIG. 7 depicts an exemplary flow chart of procedures that define a method for facilitating satisfactory experiences in connection with managing social networks.
Figure 8:
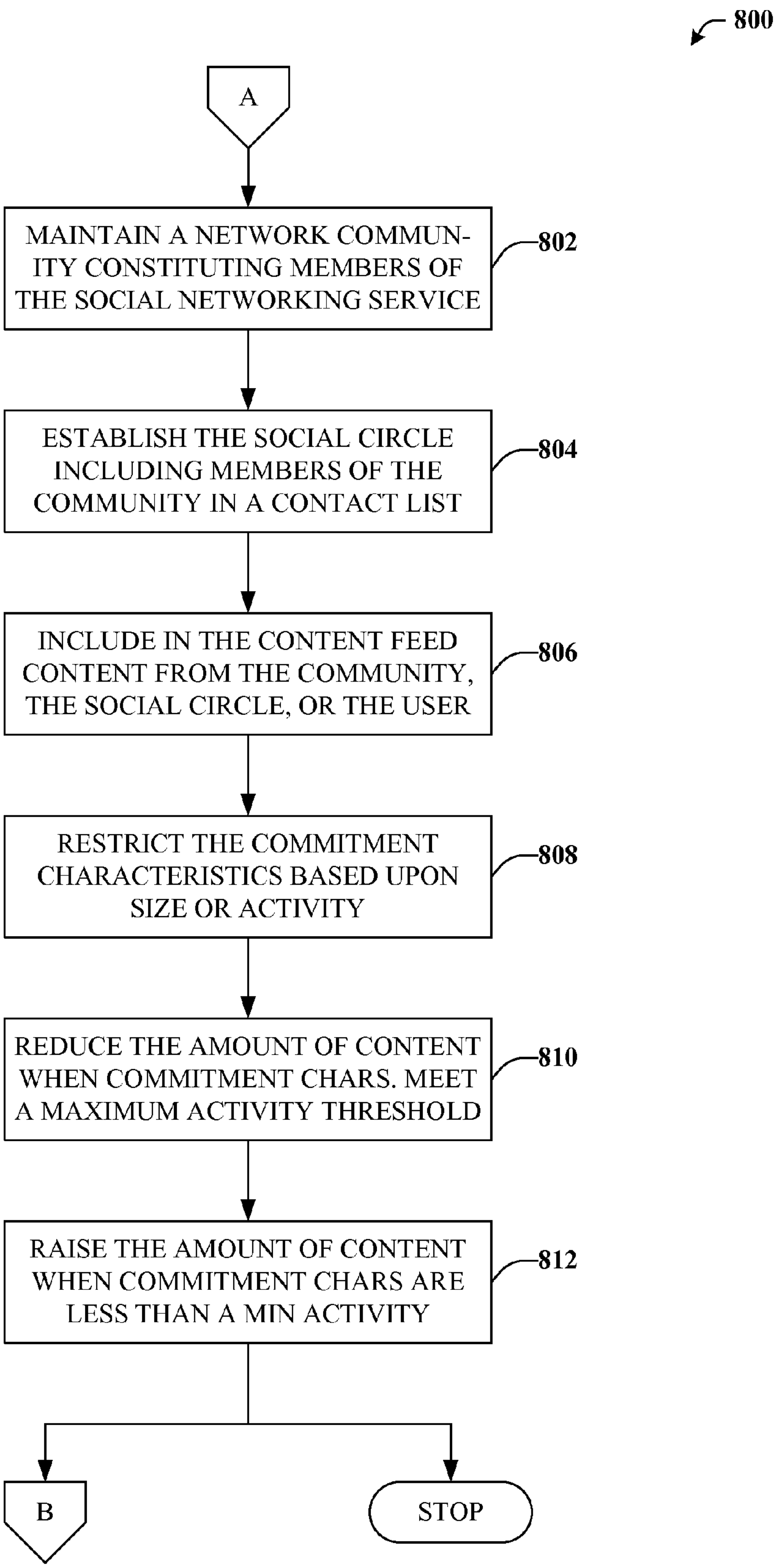
FIG. 8 illustrates an exemplary flow chart of procedures that define a method for providing additional features in connection with managing social networks.
Figure 9:
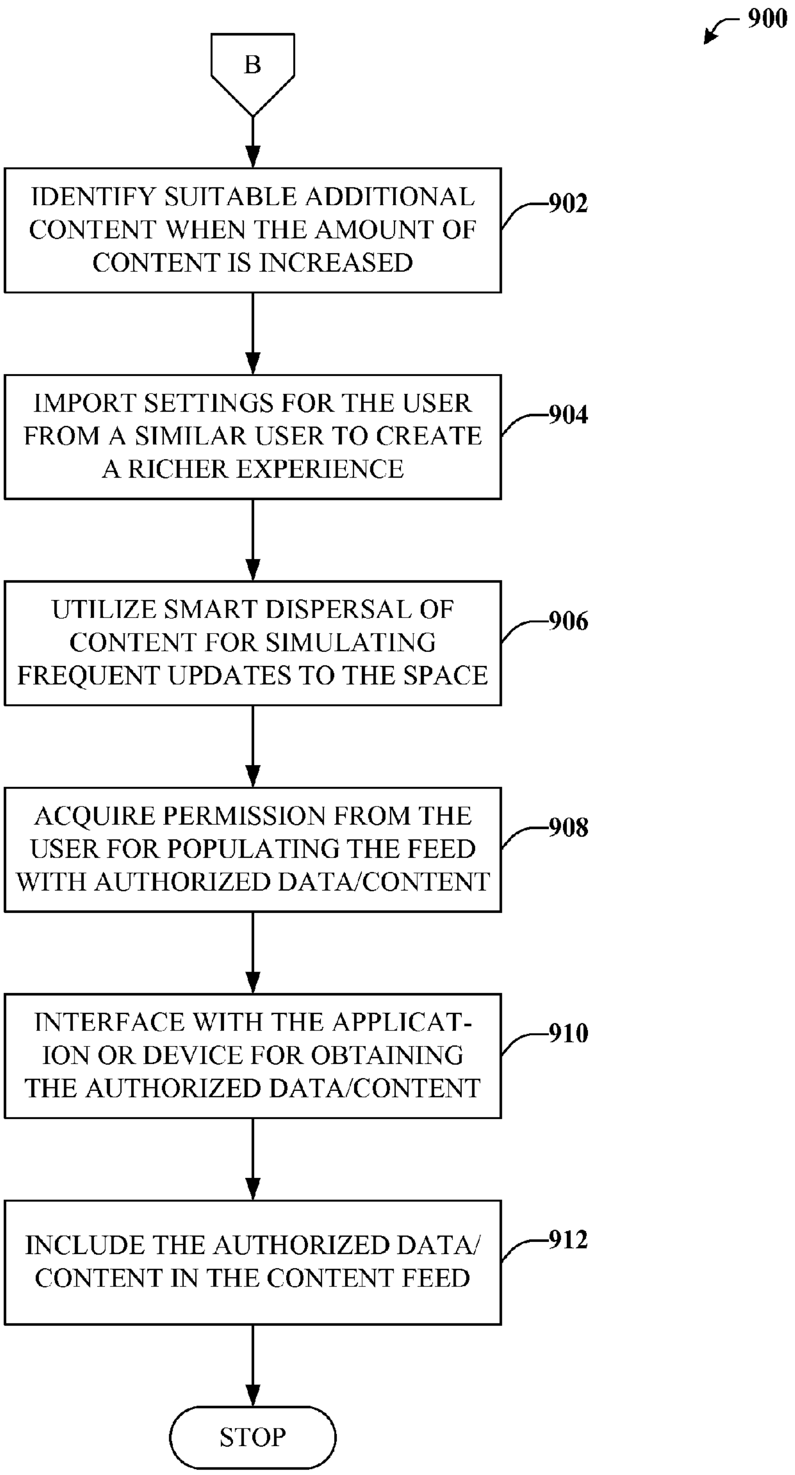
FIG. 9 depicts an exemplary flow chart of procedures defining a method for providing additional aspects or feature associated with facilitating satisfactory experiences in connection with managing social networks.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 7, exemplary computer implemented method 700 for facilitating satisfactory experiences in connection with managing social networks is illustrated. Generally, at reference numeral 702, a social circle that includes a personal space associated with a user of a social networking service can be maintained for the user. Typically, a provider of the social networking service can maintain both the personal space and the social circle that includes the personal space.

At reference numeral 704, access to the personal space by the user can be authenticated. For example, the provider can authenticate the user's request to access the personal space by way of a login screen or feature or some other type of credential exchange. Once the user is authenticated, at reference numeral 706, the personal space can be interfaced to the content feed. Moreover, content provided by a content feed can be displayed to the personal space. This content can include at least substantially any type of content known or used by conventional social networking systems or services, and according to substantially any format or schema.

However, whereas conventional social networking systems or services provide a statically defined content feed (regardless of the actual, specific content that is provided) where the amount of content does not vary except potentially by predefined user settings, the claimed subject matter can provide additional features. In particular, many of these additional features can mitigate difficulties associated with a statically defined content feed and/or enrich a user's experiences with the social networking system or service. Hence, the content feed can adapt to an individual rather than forcing the individual to fit a predefined mold. For example, at reference numeral 708, an amount of content provided by the content feed can be customized based upon a set of commitment characteristics associated with the social circle, often particularly associated with the user or the personal space.

Referring to FIG. 8, exemplary computer implemented method 800 for providing additional features in connection with managing social networks is depicted. At reference numeral 802, a network community constituting substantially all members of the social networking service can be maintained. Thus, the community can include the social circle that itself includes the personal space, and is potentially unique for the user. The community can also include substantially any number of other personal spaces, each with a potentially unique other social circle.

At reference numeral 804, the social circle can be established by included members of the network community who are designated in a contact list of the user. Typically, this list will reside in some form in the personal space and will often include friends, family, colleagues and so forth of the user. At reference numeral 806, content from at least one of the community, the social circle, or the user can be included in the content feed. Appreciably, the content feed can receive content from and transmit content to the personal space, and likewise for disparate spaces or users. It should therefore be appreciated that throttling the content feed based upon commitment characteristics can apply equally as well to content transmitted to the content feed as well as that received from the content feed.

In more detail, as mentioned at reference numeral 708, an amount of content provided by the content feed can be customized based upon various commitment characteristics associated with the personal space. At reference numeral 808, these commitment characteristics can be restricted to at least one of a recent level of activity in connection with the user, a historic level of activity in connection with the user, a size of the social circle, a recent level of activity of one or more contacts included in the social circle, a historic level of activity of one or more contacts included in the social circle, or a level of current or upcoming other obligations or commitments.

Based upon the content feed customization detailed at reference numeral 708, at reference numeral 810, the amount of content provided by (or to) the content feed can be reduced when commitment characteristics meet or exceed a maximum activity threshold. In contrast, at reference numeral 812, the amount of content provided by (or again, to) the content feed can be increased when commitment characteristics are at or below a minimum activity threshold. Hence, based potentially upon a size of a social circle, the level of current or historic activity of the members of the social circle, as well as potentially other factors, the content feed can be tailored to enrich the experiences for each respective user and/or make use more manageable.

With reference now to FIG. 9, method 900 for providing additional aspects or feature associated with facilitating satisfactory experiences in connection with managing social networks is illustrated. Generally, at reference numeral 902, suitable additional content can be identified when the amount of content provided by the content feed is increased such as that described in connection with reference numeral 812. Suitable additional content can be identified based upon at least one of a popularity of the additional content, a similarity between the user and other users who receive the additional content, or a similarity between the social circle and other social circles that receive the additional content. Appreciably, the suitable additional content can originate from beyond the social circle, even in situations in which the content feed is normally populated exclusively from sources within the social circle.

Next to be described, at reference numeral 904, settings or preferences can be imported for the user from a similar user for facilitating a richer experience in connection with the social networking service and/or the personal space. As one example, the imported settings can relate to the types of content delivered to or received from the content feed. In contrast, with respect to the amount of content provided to or obtained from the content feed, at reference numeral 906, smart dispersal of content can be utilized in connection with the content feed. Smart dispersal of content can, inter alia, simulate frequent updates to the personal space, which can foster increased excitement within the social circle. Smart dispersal can also effectively time-shift content delivery to, e.g., enhance appreciation or adequate assimilation of the content.

At reference numeral 908, permission from the user can be acquired for populating the content feed with authorized data included in a third party application or a disparate device. Accordingly, at reference numeral 910, the third party application or the disparate device can be interfaced with for obtaining the authorized data, while at reference numeral 912, the authorized data can be included in the content feed. For example, purchasing or other transactions, disparate emails or other messages, photos or other media, schedule or calendar data, location information and the like can be utilized to provide rich context or personal detail to the personal space or the social circle. In accordance therewith, such authorized content can be, upon permissive consent, can be utilized without burdening the user with time-consuming labor or maintenance. Appreciably, these features as well can reduce the level of commitment necessary for maintaining a dynamic personal space, thereby potentially increasing a user's degree of satisfication.

Figure 10:
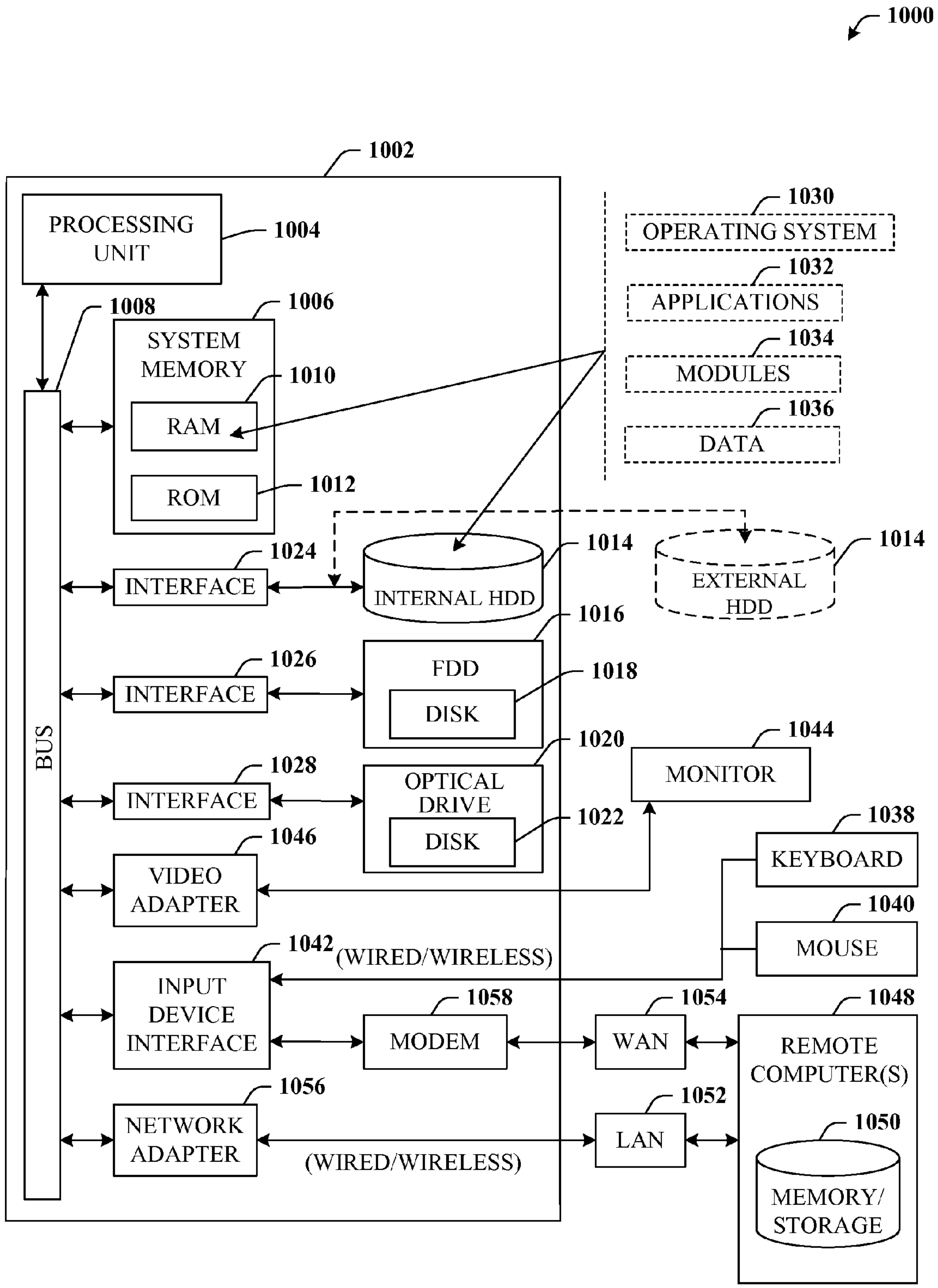
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus

1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11(a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 10 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 11:
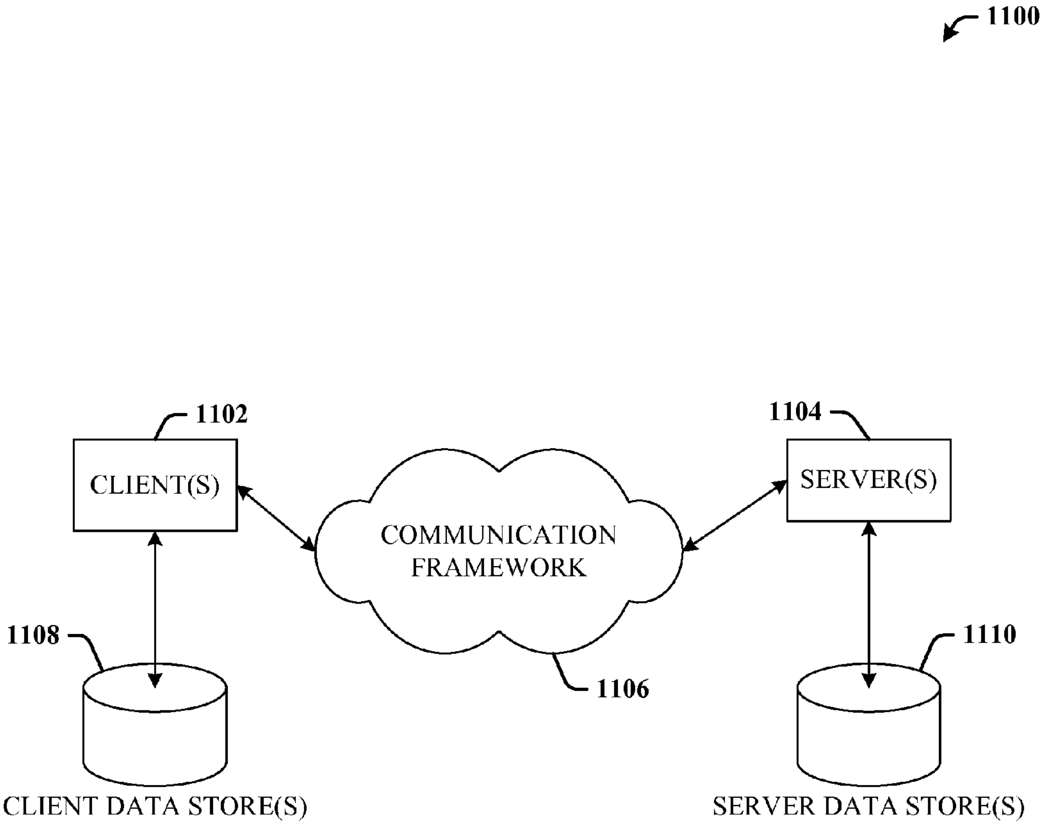
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system comprising:

one or more processors;

memory stored on the one or more processors;

an authentication component stored in memory and executed by the one or more processors to authorize access to a personal space associated with a social circle, the personal space is maintained by a provider of a social networking service and is associated with a user of the social networking service;

an interface component stored in memory and executed by the one or more processors to interface the personal space to a content feed; and a customization component stored in memory and executed by the one or more processors to throttle the content feed based upon a set of commitment characteristics associated with the social circle.

2. The system of claim 1, the interface component further to display to the personal space content provided by the content feed.

3. The system of claim 1, the personal space is a node of the social circle maintained by the provider and the social circle includes a set of disparate nodes linked to the node, each disparate node represents a contact described by the personal space.

4. The system of claim 1, the social circle constitutes a portion of a community that is maintained by the provider and accessible by way of the social networking service.

5. The system of claim 1, the content feed provides content available from a community maintained by the provider.

6. The system of claim 1, the content feed provides content available from a contact included in the social circle.

7. The system of claim 1, the set of commitment characteristics includes at least one of a recent level of activity in connection with the user, a historic level of activity in connection with the user, a size of the social circle, a recent level of activity of one or more contacts included in the social circle, a historic level of activity of one or more contacts included in the social circle, or a level of current or upcoming other obligations or commitments.

8. The system of claim 1, the customization component reduces content flow from the content feed when commitment characteristics surpass a maximum activity threshold.

9. The system of claim 1, the customization component increases content flow from the content feed when commitment characteristics fall below a minimum activity threshold.

10. The system of claim 9, the customization component identifies suitable additional content to include in the content feed based upon at least one of a popularity of the additional content, a historic significance of the additional content, a similarity between the user and other users who receive the additional content, or a similarity between the social circle and other social circles that receive the additional content.

11. The system of claim 1, the customization component filters or selects content from the content feed based upon a priority associated with content, the priority is determined based upon at least one of settings or preferences associated with the user, settings or preferences associated with a similar user space, machine learning techniques in connection with historic activity or behavior, or machine-based inferences in connection with satisfactory use of the social networking service.

12. The system of claim 11, the customization component anonymously imports settings or preferences from the similar user space in order to facilitate a richer experience for the user in connection with the personal space.

13. The system of claim 1, further comprising a publication component that provides to the content feed content from the personal space or the user.

14. The system of claim 13, the publication component employs smart dispersal of content to the content feed in order to simulate frequent updates to the personal space.

15. The system of claim 13, further comprising a negotiation component that acquires permission from the user to populate the content feed with authorized content included in a third party application or a disparate device.

16. The system of claim 1, the negotiation component interfaces with the third party application or the disparate device to obtain the authorized content, and the publication component includes the authorized content in the content feed.

17. A computer implemented method comprising:

maintaining, by at least one processor, for a user of a social networking service a social circle that includes a personal space;

authenticating, by the at least one processor, access to the personal space by the user;

interfacing, by the at least one processor, a content feed to the personal space; and employing a processor for customizing an amount of content provided by the content feed based upon a set of commitment characteristics associated with the social circle.

18. The method of claim 17, further comprising at least one of the following acts:

maintaining a network community constituting substantially all members of the social networking service;

establishing the social circle including members of the network community designated in a contact list of the user;

including in the content feed content from at least one of the community, the social circle, or the user;

restricting the commitment characteristics to at least one of a recent level of activity in connection with the user, a historic level of activity in connection with the user, a size of the social circle, a recent level of activity of one or more contacts included in the social circle, a historic level of activity of one or more contacts included in the social circle, or a level of other obligations;

reducing the amount of content provided by the content feed when commitment characteristics meet or exceed a maximum activity threshold; or increasing the amount of content provided by the content feed when commitment characteristics are at or below a minimum activity threshold.

19. The method of claim 17, further comprising at least one of the following acts:

identifying suitable additional content when the amount of content provided by the content feed is increased;

importing settings or preferences for the user from a similar user for facilitating a richer experience in connection with the social networking service;

utilizing smart dispersal of content in connection with the content feed for simulating frequent updates to the personal space;

acquiring permission from the user for populating the content feed with authorized data included in a third party application or a disparate device;

interfacing with the third party application or the disparate device for obtaining the authorized data; or including the authorized data in the content feed.

20. A computer storage media having computer executable instructions encoded thereon, the computer executable instructions for execution by a processor to perform operations comprising:

authorizing access to a personal space associated with a social circle, the personal space is maintained by a provider of a social networking service and is associated with a user of the social networking service;

interfacing the personal space to a content feed;

providing to the content feed outgoing content from the personal space or the user, the providing utilizing smart dispersal of outgoing content in order to simulate frequent updates to the personal space; and throttling the content feed based upon a set of commitment characteristics associated with the user, the set of commitment characteristics includes at least one of a recent level of activity in connection with the user, a historic level of activity in connection with the user, a size of the social circle, a historic level of activity of one or more contacts included in the social circle, a recent level of activity of one or more contacts included in the social circle, or a level of other commitments or obligations.

* * * * *